(12) United States Patent
Geotes

(10) Patent No.: US 11,591,054 B1
(45) Date of Patent: Feb. 28, 2023

(54) FLOATATION ATTACHMENT DEVICE

(71) Applicant: George Geotes, Palm Beach Gardens, FL (US)

(72) Inventor: George Geotes, Palm Beach Gardens, FL (US)

( * ) Notice: Subject to any disclaimer, the term of this patent is extended or adjusted under 35 U.S.C. 154(b) by 0 days.

(21) Appl. No.: 17/728,417

(22) Filed: Apr. 25, 2022

(51) Int. Cl.
*B63C 7/10* (2006.01)
*G02C 11/00* (2006.01)

(52) U.S. Cl.
CPC ............. *B63C 7/10* (2013.01); *G02C 11/00* (2013.01)

(58) Field of Classification Search
CPC .... B63C 7/00; B63C 7/06; B63C 7/08; B63C 7/10; B63C 7/16; G02C 11/00
USPC .................................. 441/133, 136; 351/43
See application file for complete search history.

(56) References Cited

U.S. PATENT DOCUMENTS

| | | | |
|---|---|---|---|
| 6,355,374 B1 | 3/2002 | Wirsching | |
| 6,755,708 B1* | 6/2004 | McLarty | B63C 7/10 441/95 |
| 7,018,258 B2* | 3/2006 | McLarty | B63B 22/12 441/113 |
| 7,261,606 B2 | 8/2007 | Mickelson et al. | |
| 8,888,545 B2* | 11/2014 | Rossini | B63B 32/70 441/6 |
| 9,903,682 B1* | 2/2018 | Fyksen, Jr. | F41B 5/066 |
| 10,256,861 B2 | 4/2019 | Burns | |
| 10,757,238 B1 | 8/2020 | Porta | |
| 2012/0291182 A1 | 11/2012 | Kovanda | |
| 2016/0227896 A1 | 8/2016 | Chien et al. | |
| 2018/0115638 A1 | 4/2018 | Bower et al. | |
| 2020/0153954 A1 | 5/2020 | Phillips | |
| 2021/0093058 A1 | 4/2021 | Druker et al. | |

FOREIGN PATENT DOCUMENTS

| | | |
|---|---|---|
| BR | 102018011423 A2 | 12/2019 |
| KR | 20180081857 A | 7/2018 |
| WO | 200305684 A1 | 1/2003 |

OTHER PUBLICATIONS https://gopro.com/en/US/shop/mounts-accessories/hero7-black-floaty/AFLTY-004.html, dated Oct. 5, 2022.
https://www.amazon.com/GoPro-Floaty-Backdoor-Official-Accessory/dp/B00F19PZXW, dated Oct. 5, 2022.

\* cited by examiner

*Primary Examiner* — Daniel V Venne
(74) *Attorney, Agent, or Firm* — Akerman LLP

(57) ABSTRACT

A floatation attachment system may include a floatation attachment device configured to be attached to an object. The floatation attachment device may include a floatation material configured to provide buoyancy to the object it attaches and an attachment surface configured to directly attach the object. The floatation material may include a material that expands or generates gas upon contact with water. The system may include a dispenser such as a sheet of pre-cut floatation attachment devices or for manual cutting for customized shapes and sizes. In one instance, the system includes a tape roll dispenser for dispensing floatation attachment devices from a roll.

20 Claims, 15 Drawing Sheets

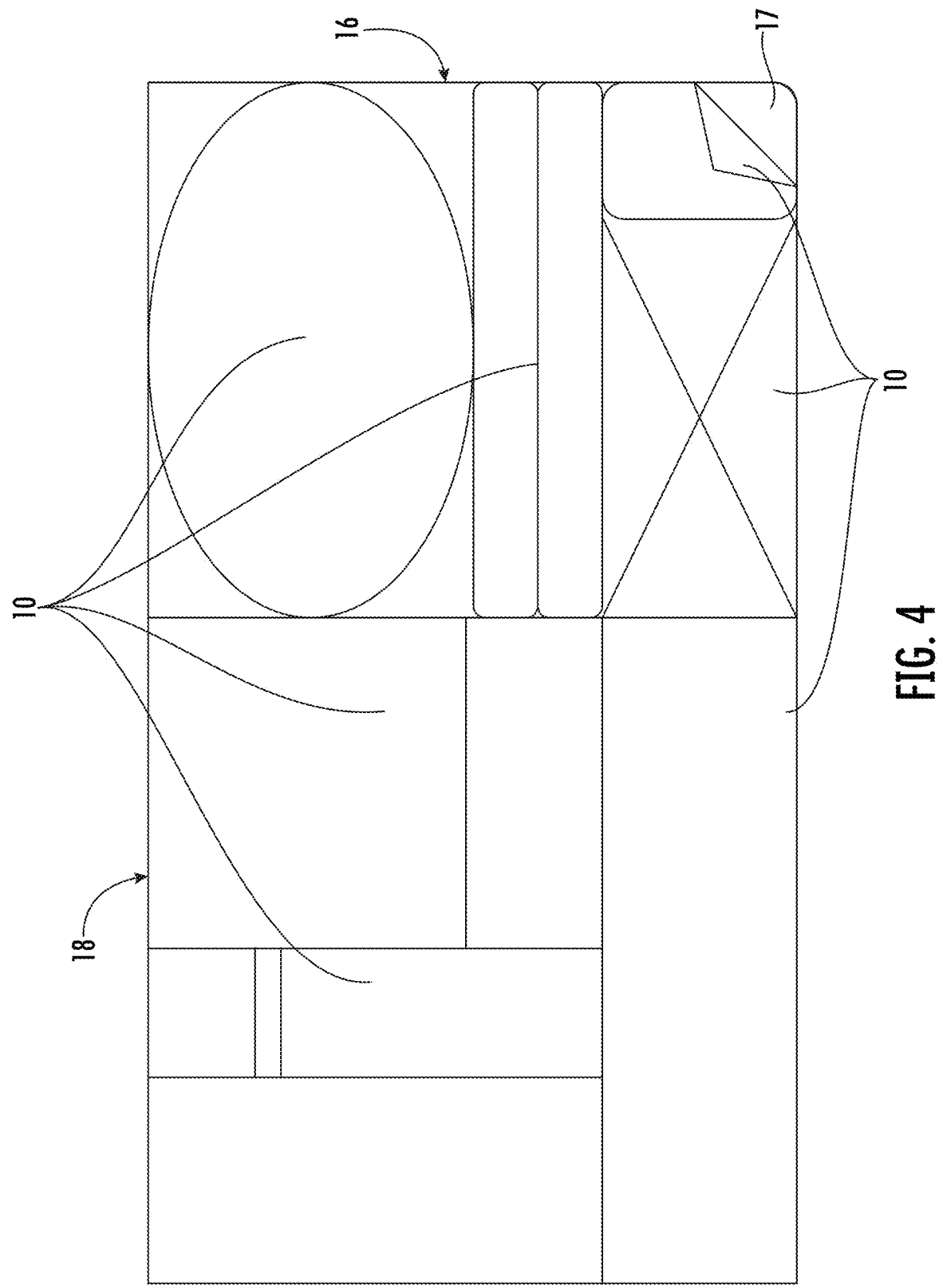

FLOATATION ATTACHMENT DEVICE

TECHNICAL FIELD

The present disclosure is directed to floatation devices for providing buoyancy objects, more particularly floatation devices designed to attach to objects to prevent such objects from sinking when dropped into a body of water.

BACKGROUND

Personal items are often carried or used near bodies of water where they are at risk of falling into the water and being ruined or lost to the watery abyss. Current solutions include key floats that couple to keys via a key ring, floating sunglasses straps that couple between temple tips of ear pieces and wrap around the back of a wearer's head, and floatation housings for phones. These solutions are bulky and obtrusive. What is needed are improved solutions to prevent items such as cell phones, keys, jewelry, and sunglasses from sinking when dropped into a body of water.

SUMMARY

In one aspect, a floatation attachment system includes a floatation attachment device configured to be attached to an object. The floatation attachment device may include a floatation material configured to provide buoyancy to the object it attaches and an attachment surface configured to directly attach the object.

In various configurations, the system further includes a dispenser configured to dispense a plurality of floatation attachment devices. The dispenser may include a sheet of the plurality of floatation attachment devices in multiple pre-cut shapes and dimensions. In one example, the sheet may include a backing layer positioned on along the attachment surface that is removable to expose the attachment surface for attachment to the object. In another example, the dispenser comprises a tape roll including a backing layer positioned along the attachment surface that is removable to expose the attachment surface for attachment to the object.

In some configurations, the floatation material includes an expansion material.

In one example, the expansion material includes one or more gas generating reactants that generate gas upon contact with water or upon being mixed together. The expansion material may further include a compressed material impregnated with the one or more gas generating reactants.

In another example, floatation attachment device further includes a chamber housing the one or more gas generating reactants and an opening between the chamber and an exterior of the floatation attachment device. The floatation attachment device may further include a water control device including a valve, water selective membrane, or water sensitive material positions to regulate water inflow to the chamber. In one instance, the water control device comprises a pressure activated one-way valve that allows water inflow upon exposure to a predetermined pressure.

In another example, the floatation attachment device further includes at a least first chamber housing a first material and a second chamber housing a second material, a water sensitive material separating the first and second chambers, an opening to an exterior of the floatation attachment device, and a passage between the opening and the water sensitive material. The expansion material may include the first material and the second material and the first material and second materials may be configured to react when contacted to generate a gas. In one instance, at least one of the first chamber or the second chamber is configured to expand when the first and second materials react to generate the gas.

In another example, the floatation attachment device further includes at a least first chamber housing a first material and a second chamber housing a second material, a water sensitive material separating the first and second chambers, an opening to an exterior of the floatation attachment device, and a passage between the opening and the water sensitive material. The expansion material may include the first material and the second material and the first material may be configured to expand when contacted with the second material. In one instance, at least one of the first chamber or the second chamber is configured to expand when the first material expands.

In one configuration, the floatation attachment device has a thickness of between about 0.1 cm and about 3 cm and between about 0.5 and about 4 inches in width and length. In one instance, the length is about 1 inch and the width is about 2 inches.

In one configuration, the floatation attachment device includes two strips of floatation material that attach to interior portions of earpieces of a pair of glasses.

BRIEF DESCRIPTION OF THE DRAWINGS

The novel features of the present invention are set forth with particularity in the appended claims. However, the various embodiments of the present invention described herein, both as to organization and manner of operation, may be best understood by reference to the following description, taken in conjunction with the accompanying drawings in which:

FIG. 4 illustrates a sheet including a plurality of pre-cut floatation attachment devices according to various embodiments described herein.

FIGS. 7A-7C illustrate views of a phone having a floatation attachment device attached to the back of the phone according to various embodiments described herein, wherein FIG. 7A is a front view, FIG. 7B is a back view, FIG. 7C is a side view.

FIGS. 8A & 8B illustrate views of a pair of sunglasses having a floatation attachment device attached along ear pieces according to various embodiments described herein, wherein FIG. 8A is an elevated front view and FIG. 8B is an overhead view.

FIGS. 9A-9D illustrate views of an expandable floatation attachment device including an expansion floatation material according to various embodiments described herein, wherein FIG. 9A shows a front view in an unexpanded state, FIG. 9B shows a side view of the unexpanded state, FIG. 9C shows a front view in an expanded state, and FIG. 9D shows a side view in an expanded state.

DESCRIPTION

FIGS. 1A-20 illustrate various embodiments of a floatation attachment device wherein like numbers identify like features.

Figure 1A:
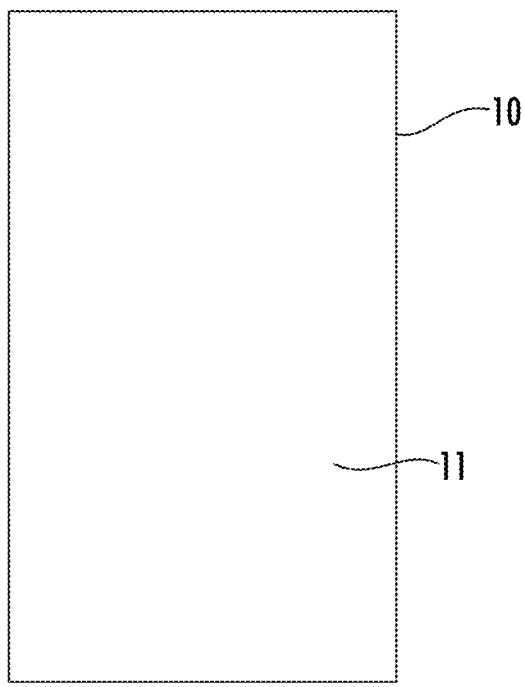
FIGS. 1A & 1B illustrate an embodiment of a floatation attachment device according to various embodiments described herein.
Figure 1B:
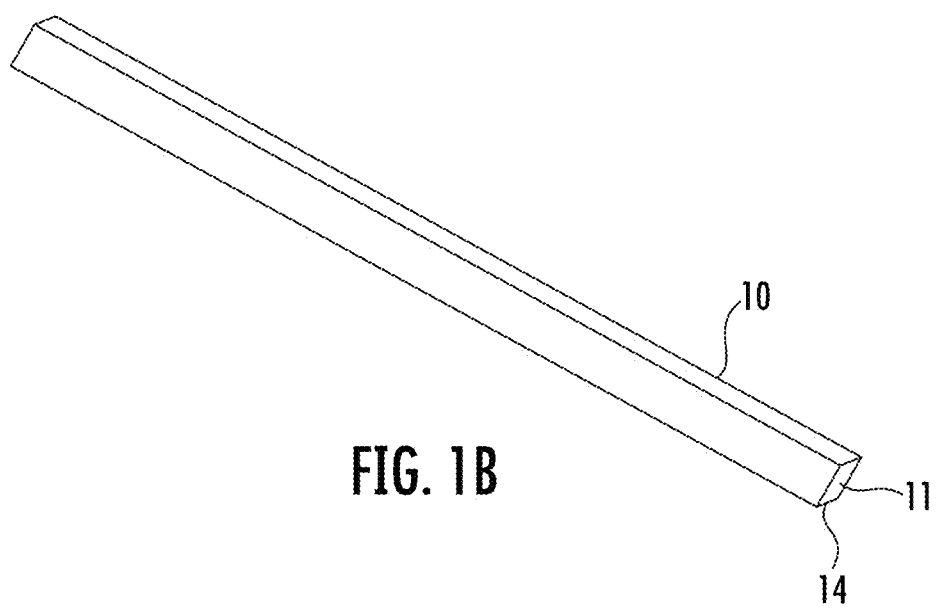

With specific reference to FIGS. 1A & 1B a floatation attachment device 10 may comprise or consist of one or more various floatation materials 20 and one or more attachment surfaces 12 adapted to attach to an object 30 (see, e.g., FIGS. 4A-6B). The floatation material 20 is configured to impart buoyancy to the floatation attachment device 10 to support floatation to the object 30 in liquid, typically a body of water. As described in more detail below, in some configurations, the floatation attachment device 10 includes a floatation material 20 configured to undergo a degree of expansion, such as a slight expansion, upon exposure to liquid to increase buoyancy.

As introduced above, unlike conventional floatation devices that require an enclosure, such as a case, that encloses the object to be floated, the present floatation attachment device 10 may include an attachment surface 12 adapted to attach the floatation attachment device 10 directly to an object 30. While an enclosure could be used, such is not a requirement for providing floatation when an attachment surface 12 as described herein is provided.

The attachment surface 12 may extend along the floatation material 20 or another surface of the floatation attachment device 10. The attachment surface 12 may include an attachment mechanism 14, configured to attach directly to a surface of an object 30 to provide floatation capabilities when the object 30 encounters water. In various embodiments, the attachment mechanism 14 comprises an adhesive or a mateable structure configured to mate with a corresponding mateable structure positioned on the object 30 such as snaps, hook and loop, rail and groove, or clips. Example adhesives include epoxies, two-component, single-component, polymer, polyurethane, neoprene adhesive, polychloroprene glue, and/or polyester glue. The adhesive may be selected to be one that maintains its adhesive function for at least one to multiple uses in the water when the floatation attachment device 10 is providing buoyancy to float the attached object 2.

Figure 2A:
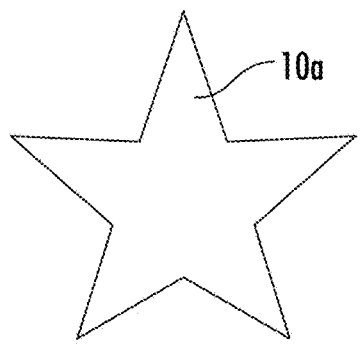
FIGS. 2A-2F exemplary shapes of the floatation attachment device according to various embodiments described herein.
Figure 2B:
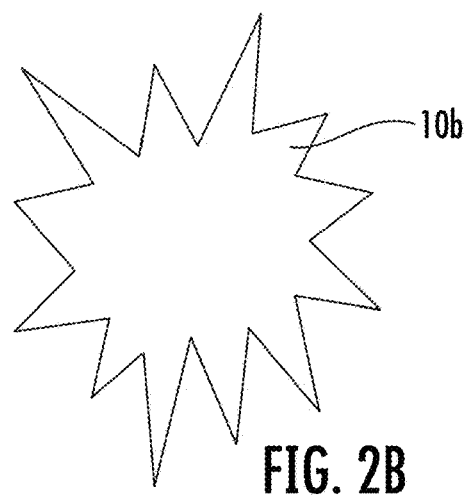
Figure 2C:
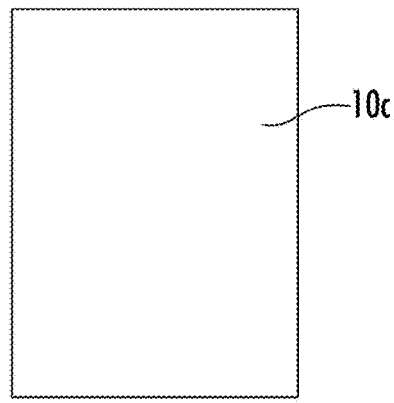
Figure 2D:
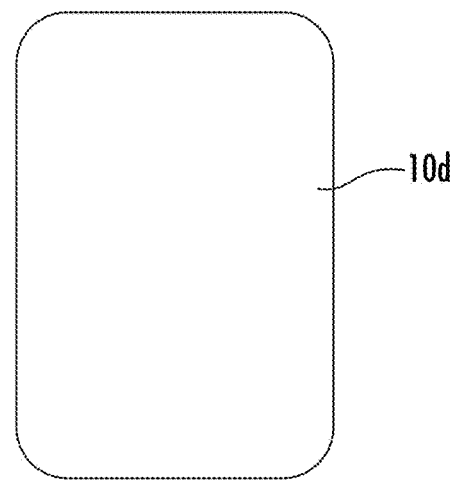
Figure 2E:
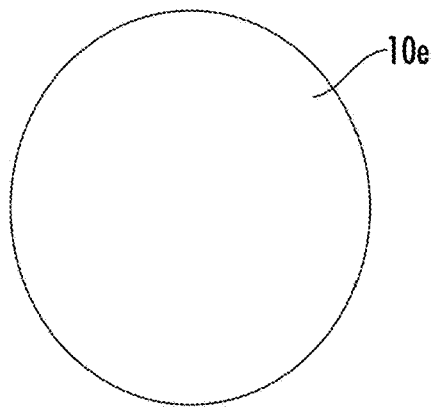
Figure 2F:
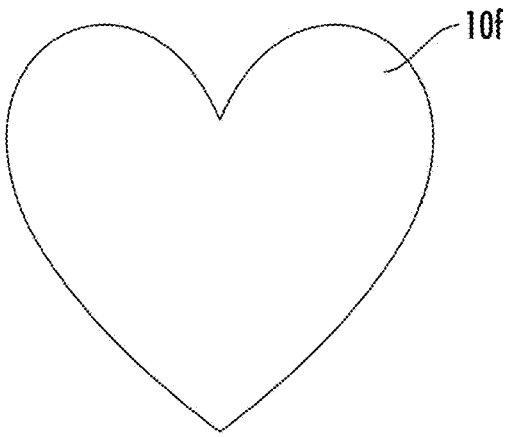

The floatation attachment device 10 may be provided in various shapes and sizes adequate to provide floatation to objects to which they are adhered. The shapes may be decorative or purpose-based, e.g., to match dimensions and/or contours of an object (see, e.g. FIGS. 7A & 7B). FIGS. 2A-2F illustrate various example shapes of floatation attachment devices 10. FIG. 2A depicts a star 10a and FIG. 2B depicts a starburst 10b. FIG. 2C depicts a typical square or rectangle 10c while FIG. 2D illustrates a square or rectangle having rounded corners 10d. FIG. 2E depicts an arcuate shape such as a circle or oval 10e and FIG. 2F depicts a heart 10f. Other shapes may also be used, such as geometric, non-geometric, or free form.

In various embodiments, the floatation attachment device 10 may be provided in pre-cut shapes or dimensions, such as those described herein. The floatation attachment device 10 may be provided singly or in groups. In various embodiments, the floatation attachment device 10 may be provided in a sheet or roll.

The floatation attachment device 10 may be provided in various thicknesses considering use. In some embodiments, the floatation attachment device 10 comprises a thin thickness as to be unobtrusive to use of the object 30. For example, the floatation attachment device 10 may have a thickness between about 0.1 cm and about 3 cm. Greater thicknesses may also be used. As described in more detail below, in some embodiments, the thickness of the floatation attachment device 10 may be configured to increase, e.g., when floatation material 20 is configured to expand upon contact with water.

Figure 3A:
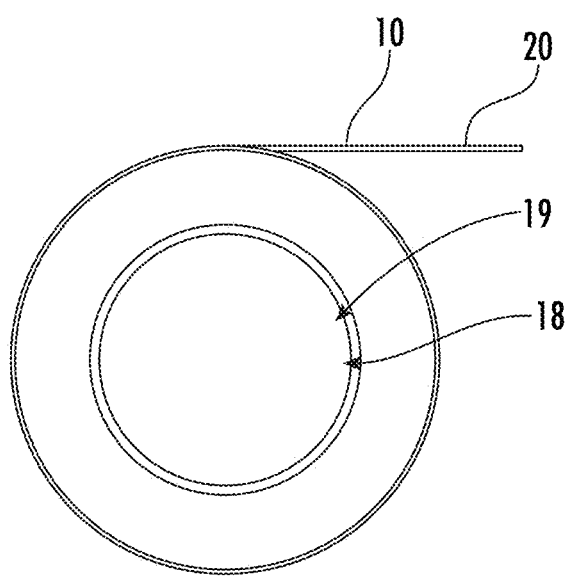
FIGS. 3A & 3B illustrate front and side views of a floatation attachment device provided in a tape roll-like dispenser for selective dispensing of multiple floatation attachment devices according to various embodiments described herein.

With reference to FIGS. 3A-4, some embodiments of a floatation attachment device 10 includes a dispenser 18 from which one or more floatation attachment devices 10 may be dispensed. A floatation attachment device 10, for example, may be provided in a sheet 16 and/or may include a backing layer 17. In some configurations, floatation attachment devices 10 may be provided along a sheet 16 comprising a strip for dispensing from a tape roll device 19, with or without a backing layer 17. In one example, a sheet 16 of pre-cut floatation attachment devices 10 may be provided from which a user may select a particular shape or dimensioned floatation attachment device 10.

Figure 3B:
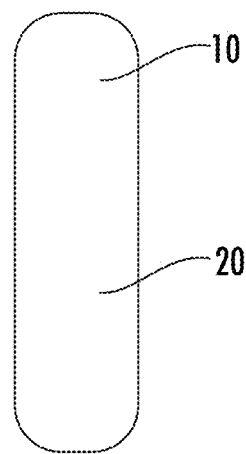

With particular reference to FIGS. 3A & 3B, one or more floatation attachment devices 10 may be provided in or on a dispenser 18 comprising a sheet 16. As shown, the sheet 16 may include a plurality of pre-cut floatation attachment devices 10 from which a user may select for attachment to desired objections. In the illustrated embodiment, the sheet 16 includes different shaped and dimensioned floatation attachment devices 10 to allow a user to choose the most suitable or desired for their use. The illustrated sheet 16 includes a backing layer 17 to which the attachment surfaces 12 of the floatation attachment devices 10 are positioned. For example, the sheet 16 may include a release backing layer 17 that may be pulled from the attachment surfaces 12, similar to a sticker or an adhesive strip backing layer to expose the attachment surface 12 for attachment to an object 10. In other embodiments, the floatation attachment devices 10 do not include a backing layer 17 and may be separated by cutting or breaking along weakened connections, such as perforations between floatation attachment devices. In some embodiments, the floatation attachment device 10 may be provided as a continuous sheet 16 from which a user may cut to desired size and shape.

As introduced above, some examples of the floatation attachment device 10 may be provided in combination with a dispenser device 18 configured to dispense floatation attachment devices 10. According to one configuration, with particular reference to FIGS. 4A & 4B, floatation attachment device 10 may include a dispenser device 18, such as a tape roll device 19 from which the floatation attachment device 10 may be pulled for use. The floatation attachment device 10 may thus be provided individually or with additional floatation attachment devices 10. In one example, a user may pull the floatation attachment device and cut it to desired dimensions and/or size for objects 30 to which it is to attach. In some embodiments, the floatation attachment device includes a backing layer 17 from which the attachment surface 12 may be exposed prior to use to reveal an adhesive or other attachment device. In some embodiments, floatation attachment devices 10 provided for dispensing from a tape roll device 19 may comprise pre-cut shapes and/or may be separated by tearing along weakened backing layer 17 or connections between floatation attachment devices 10, such as along perforations. The floatation attachment device 10 may be reusable or configured for single use.

In some embodiments, a floatation attachment device 10 includes a backing layer 17 comprising an attachment mechanism 14 mating structure, such as hook and loop, from which the floatation attachment device 10 may be released. The attachment surface 12 may include a corresponding attachment mechanism 14 mating structure for attachment to an object 30 comprising a mating structure the same or similar to that of the backing layer 17 or may be configured with another attachment mechanism 14 as described herein.

Figure 5:
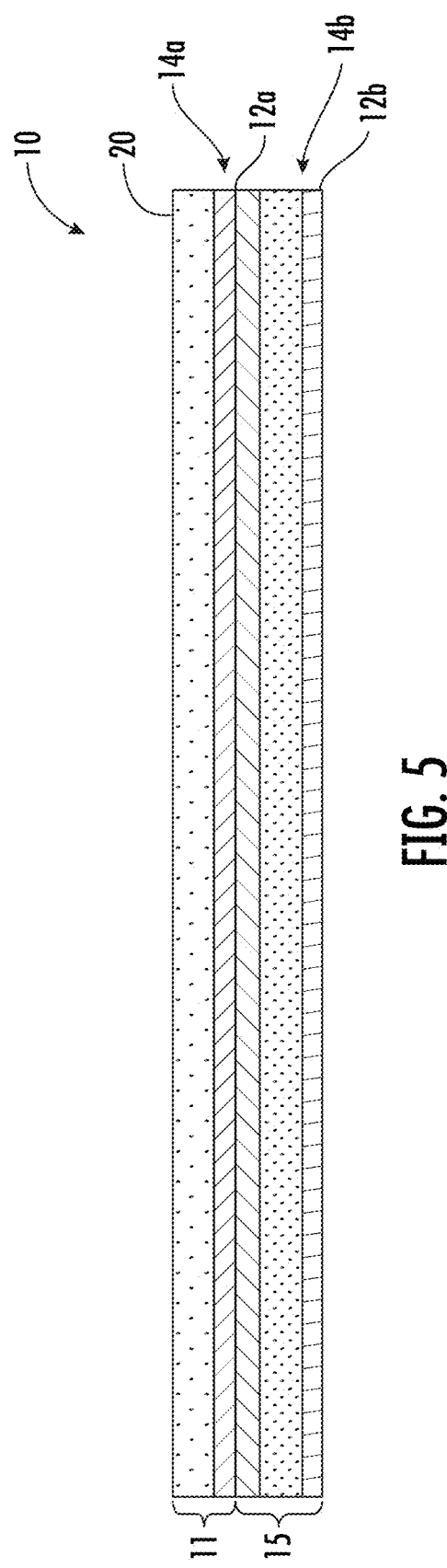
FIG. 5 illustrates a cross-section of a floatation attachment device including a backing according to various embodiments described herein.

With particular reference to FIG. 5, in one embodiment, a floatation attachment device 10 includes a floatation material portion 11 and a backing layer 15 portion and a first attachment mechanism 14a comprising corresponding mating structures, such as hook and loop, press-fit, rail and groove, clips, or snaps, along interfacing attachment surfaces 12a configured for selective attachment and detachment of the floatation material portion 11 and the backing layer portion 15. The backing layer portion 15 may include a second attachment mechanism 14b along another attachment surface 12b that comprises an adhesive for attachment to an object 30 to thereby provide an attachment site for the floatation material portion 11 along the interfacing attachment surfaces 12a of the floatation material portion 11 and the backing layer portion 15. In the illustrated embodiment, the floatation material portion 11 comprises floatation material 20 and a backing layer 15 comprising a backing layer 17. The floatation material 20 and backing layer 17 include interfacing attachment layers 12a including corresponding attachment mechanisms 14a, such as hook and loop, that may be mateably attached and detached. The backing layer 17 further includes another attachment surface 12b comprising another attachment mechanism 14b, such as adhesive. for attachment to an object 30. Once attached to the object 30, the floatation material portion 11 may be selectively attached and detached as well as interchanged with another floatation material portion 11 fitted with the same attachment mechanism 14a. In one embodiment, the attachment surface 12b may be provided with a removable backing layer to expose attachment mechanism 14b for attachment to an object 10. As described herein, the backing layer 17 may be provided with a sheet configuration, tape configuration, or otherwise. Such configurations of floatation attachment devices may be provided, for example, individually, in pre-cut shapes and dimensions, or be configured to be dispensed from a dispenser devices 18 comprising a sheet 16 from which a user may cut to size or remove pre-cut portions, or a tape roll device, or any other suitable format.

Figure 6C:
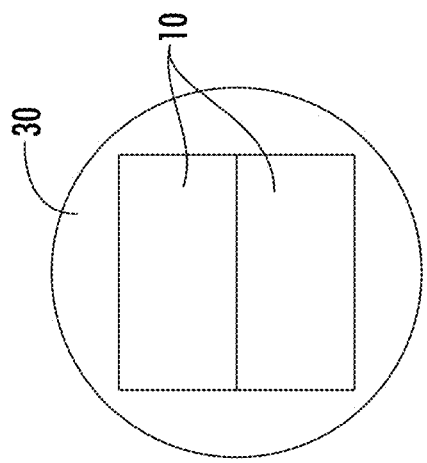
FIGS. 6A-6C illustrate floatation attachment devices attached to various objects according to various embodiments described herein.
Figure 6B:
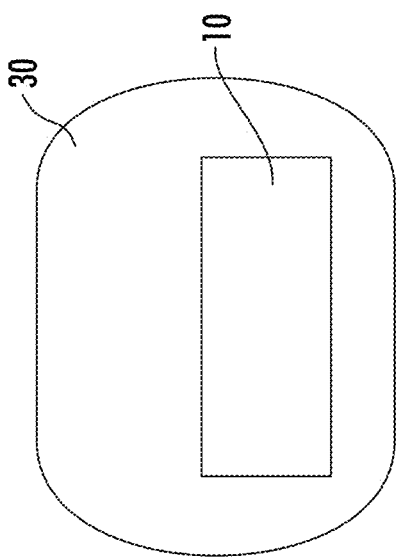
Figure 6A:
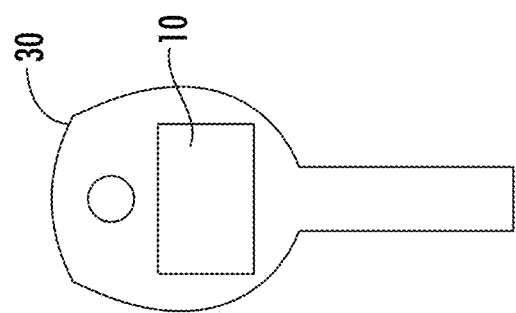

FIGS. 6A-6C illustrate an example attachment of the floatation attachment device 10 to objects 30. FIG. 6A illustrates the floatation attachment device 10 attached to an object comprising a key. FIG. 6B illustrates the floatation attachment device 10 attached to an object comprising a wireless earphone, such as an AirPod®. Multiple floatation attachment devices 10 may be attached, for example, when pulled from a tape roll device 19 or otherwise. For example, FIG. 6C illustrates two floatation attachment devices 10 attached to an object 10 comprising an Apple AirTag®. Floatation attachment device 10 can also be applied to other items such as wallet or jewelry, or any other objects not explicitly identified herein.

Figure 7C:
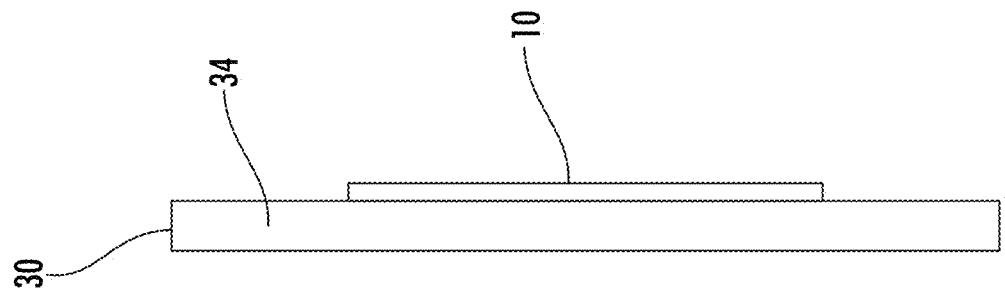
Figure 7B:
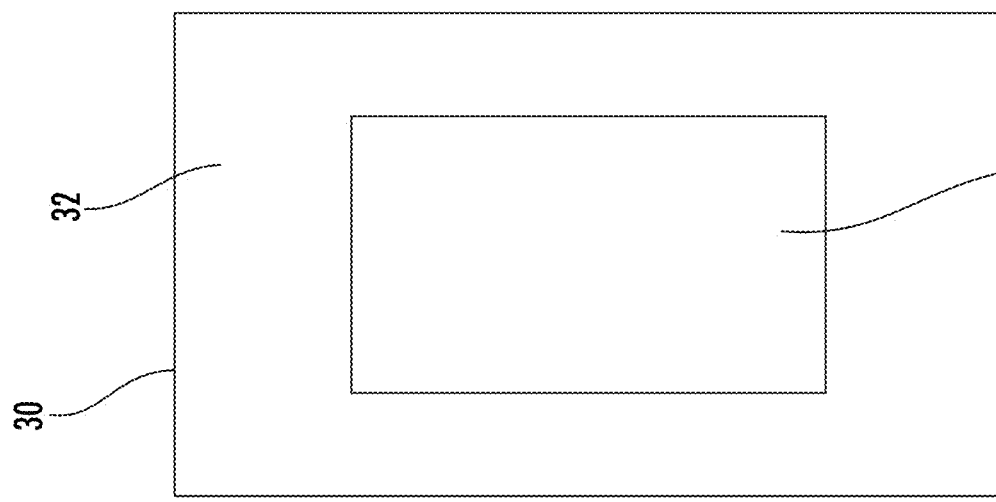
Figure 7A:
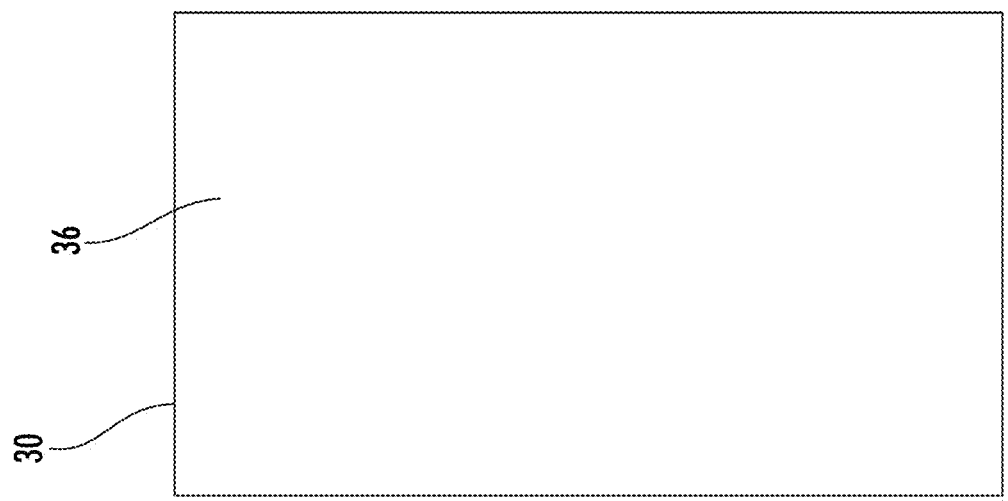

FIGS. 7A-7B illustrate an example of a floatation attachment device 10 attached to an object 10 comprising a phone. The floatation attachment device may include a thin profile floatation material 20 having an adhesive along an attachment surface (not visible, see, e.g., FIG. 1B) similar to a sticker that attaches to a back 6 of the phone as to be unobtrusive to viewing and use by a user at a front 36 of the phone and leaving available connection ports and cooling areas along side portions 34. However, in other embodiments, the floatation attachment device 10 may attach along the front 36 and/or one or more sides 34. According to some embodiments, the floatation attachment device 10 may be between about 0.1 and about 3 cm thick, and between about 0.5 and about 4 inches in width and length (with preferred dimensions of about 2 in.×about 1 in).

Figure 8A:
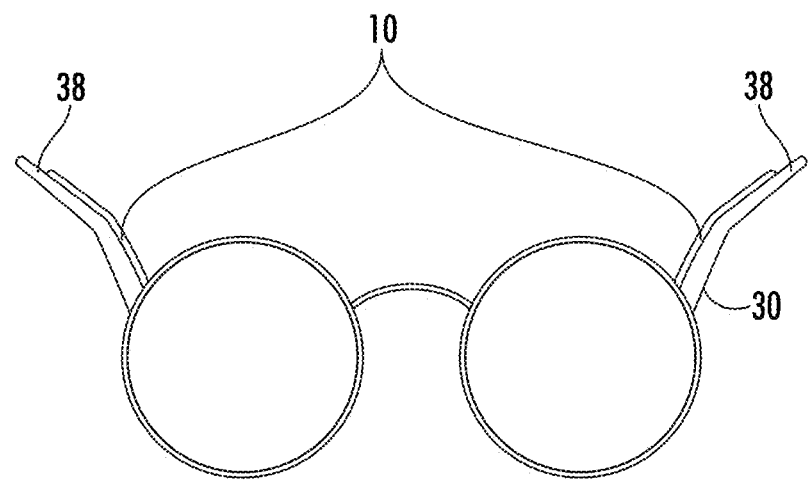
Figure 8B:
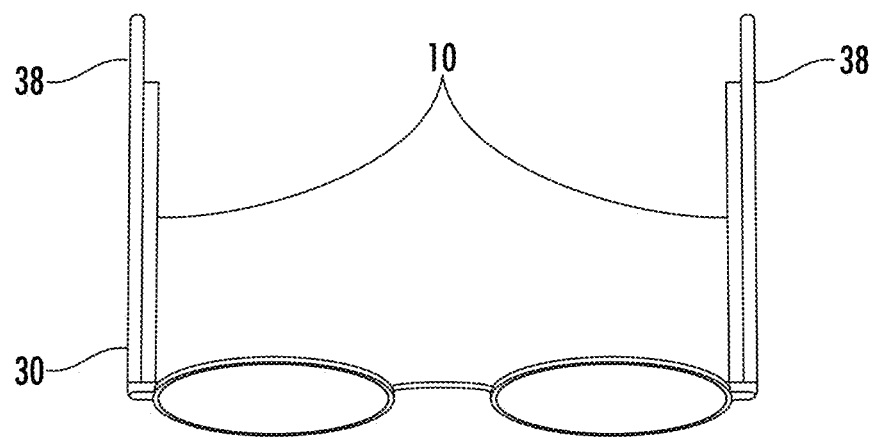

As described above and elsewhere herein, the floatation attachment device 10 may be provided in various pre-cut or user defined shapes and dimensions. FIGS. 8A & 8B provide views of the floatation attachment device 10 attached to an object 30 comprising eyeglass frames wherein the floatation attachment device 10 is applied along interior portions of temple portions of earpieces 38. In further or other embodiments, the floatation attachment device may be attached to different structures or along exterior facing portions.

The floatation attachment material 20 may include buoyant materials such as foams, aerogels, neoprene, cork, polyethylene (as a foam or solid), polypropylenes, or styrofoam. For example, the floatable material 20 may comprise a modified gel wherein all or a portion of a liquid component of a gel is replaced with a gas such as helium or hydrogen to form an aerogel and thereby add buoyancy to the floatation attachment device 10. As described in more detail below, in some embodiments, the floatable material 20 comprises an expansion material 22 (see, e.g., FIGS.

9A-9D) that itself expands when contacted with water and/or comprises gas generating reactants 24 (see, e.g., FIGS. 10A & 10B) that generate gas when combined and/or combined with water.

Figure 9A:
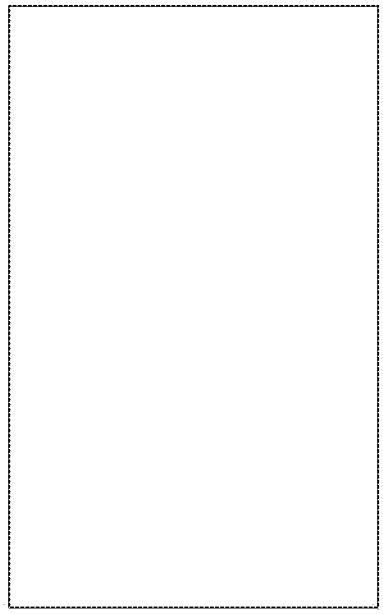
Figure 9B:
Figure 9C:
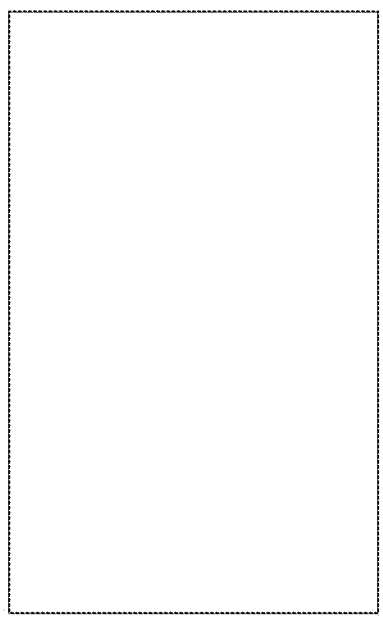
Figure 9D:

With particular reference to FIGS. 9A-20, in various embodiments, the floatation attachment device 10 or portion thereof may be configured to expand upon contact with water. Contact with water may be used as a mechanism to cause a conformational or shape change of the floatation attachment device 10, such as an associated floatation material 20 of the floatation attachment device 10, that increases buoyancy. For example, with reference to FIGS. 9A & 9B, the floatation material 20 of floatation attachment device 10 is shown in a dry condition wherein the dimensions of the floatation material 20 are not expanded. With reference to FIGS. 9C & 9D, upon contact with liquid, the floatation material 10 (which could include hydromorphic polymers, hydrophilic polymers, hydrogels, material that may release gas from a chemical relation upon contact with water, or material that may have a chemical restructuring causing a less dense material) expands in at least one dimension, e.g., such as in thickness depicted in FIG. 9D.

According to some embodiments, a floatation attachment device 10 having a floatation material 20 comprising an expansion material 22 may be configured for single use. For example, the floatation material 20 may be unsuitable for repeated exposure to liquid or may lose buoyancy as a result of the floatation material 20 having its air concentration or chemical composition altered, or failing to return to its original size.

Figure 10:
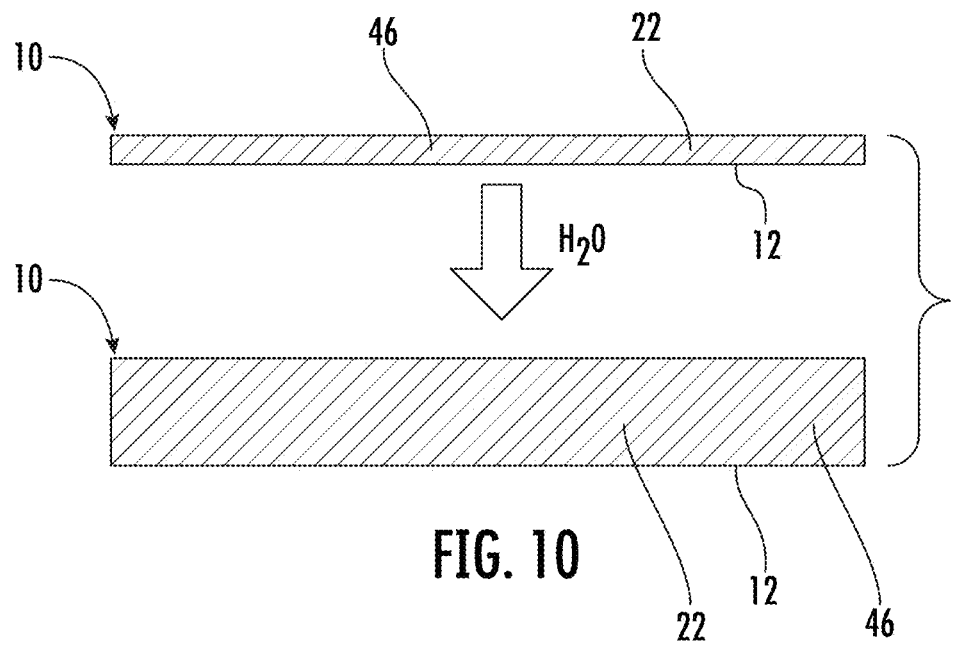
FIG. 10 illustrates cross-section views of an expandable floatation attachment device in a non-expanding state and in an expanded state upon contact with water according to various embodiments described herein.
Figure 11:
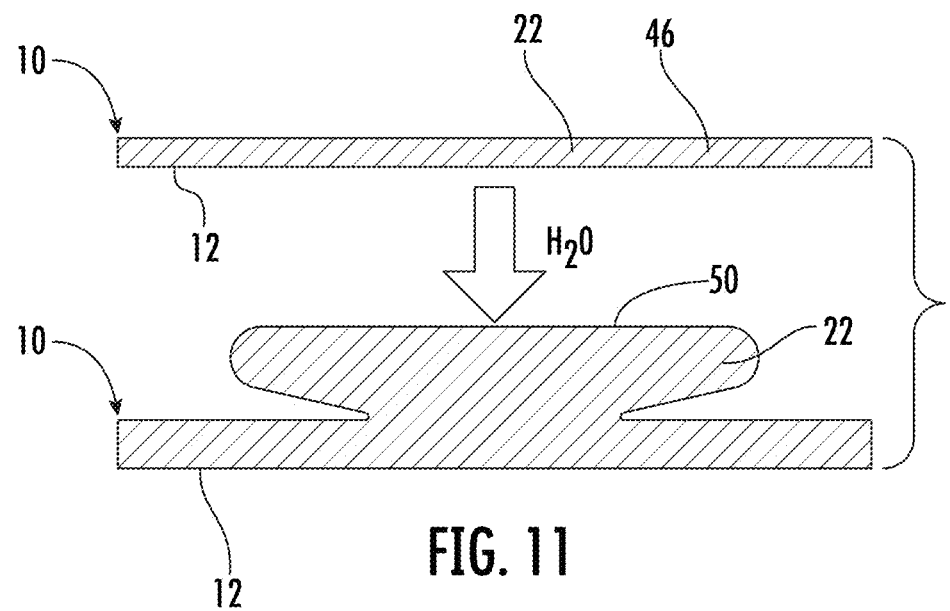
FIG. 11 illustrates cross-section views of an expandable floatation attachment device in a non-expanding state and in an expanded state upon contact with water according to various embodiments described herein.
Figure 12:
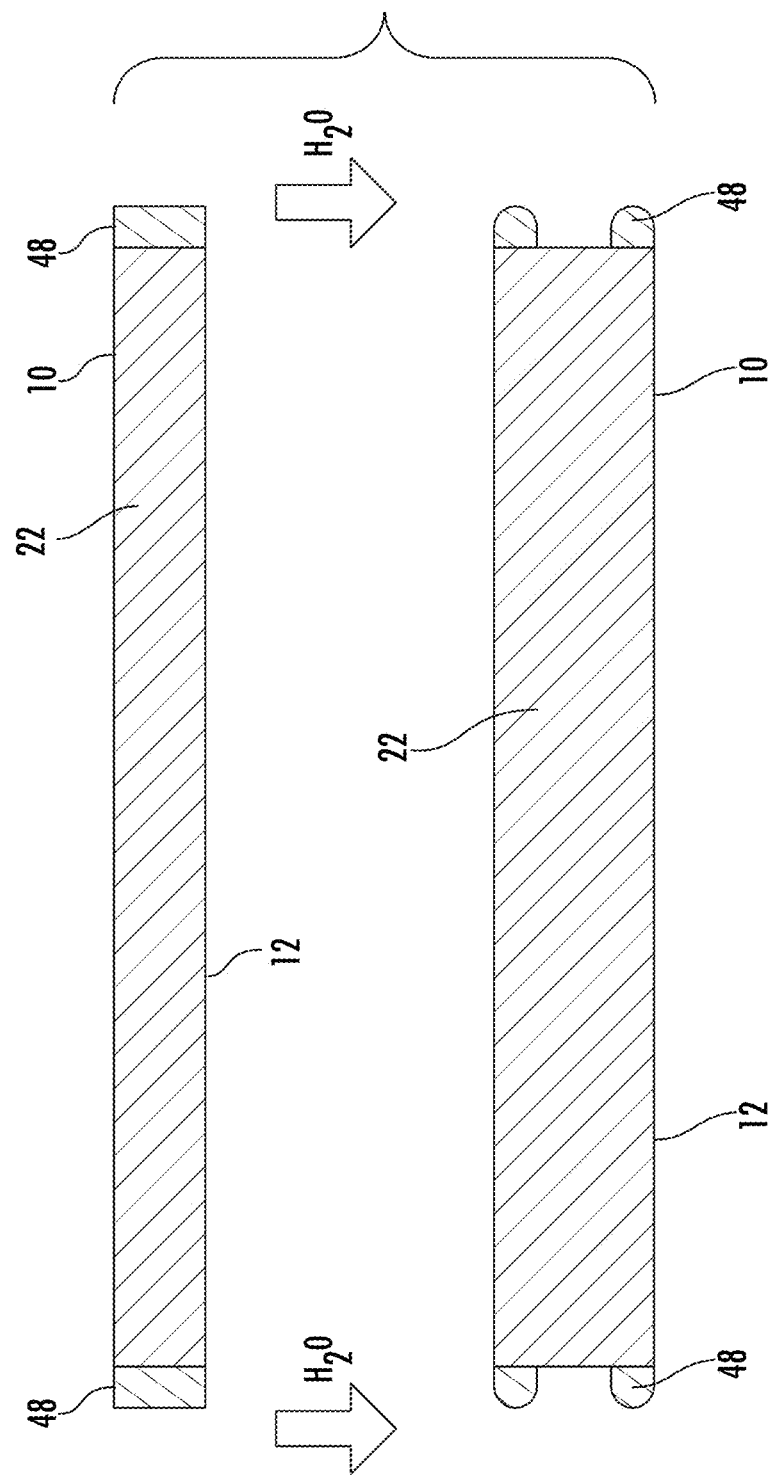
FIG. 12 illustrates cross-section views of an expandable floatation attachment device in a non-expanding state and in an expanded state upon contact with water according to various embodiments described herein.

In some embodiments, an expansion material 22 comprises a gel, foam, or material defining voids or chambers, which may or not be compressed in an unexpanded state. In one example, the expansion material 22 may be in a compressed state whereby contact with water, either directly or indirectly, causes the expansion material 22 to expand. Expansion may include supplying gas into the expansion material 22 to expand the material or generating the expanded form by allowing infiltration of gas or supplying gas therein. In some instances, the expansion material may comprise a pre-expansion form of the expansion material 22, e.g., a material that forms a buoyant mass when exposed to the gas, which may include formation of gas filled voids. In some embodiments, the gas may be compressed in a liquid state whereby contact with liquid drives release of the gas into the expansion material 22. In one embodiment, the expansion material 22 is compressed and the contact with water releases the pressure allowing the expansion material 22 to decompress and thereby expand. In some embodiments, gas may be introduced during decompression or a compressed liquid within the expansion material 22, such as positioned with a matrix or compressed matrix, may transition to a gas or expand due to release of pressure. In one embodiment, expansion of the expansion material 22 may increase surface area of the floatation attachment device 10, e.g., by expanding an expandable chamber 46 or by forming an expansion surface 50. For example, FIG. 10 illustrates a floatation attachment device including a chamber 46 housing expansion material 22. Upon contact with water, the expansion material 22 expands within the chamber 46 increasing surface area and buoyancy. FIG. 11 illustrates a floatation attachment device 10 including a chamber 46 housing an expansion material 22. Upon contact with water, the expansion material 22 expands from the chamber 46 to form an expansion surface 50 increasing surface area and buoyancy.

In one example, the expansion material 22 includes a porous matrix, e.g., a gel, foam, natural or synthetic polymer, or sponge material, that may be compressed when the floatation attachment device 10 is in the non-expanded state. In another example, the expansion material 22 is covered and/or retained in a compressed state by one or more of water control devices 44 configured to contain and/or retain the expansion material 22 in a non-compressed state. In one configuration, water sensitive materials 48 may be arranged to hold expansion materials 22 in a compressed state such that sufficient water exposure breaks down the water sensitive material 48 to allow the expansion material 22 to expand and increase buoyancy. For example, with reference to FIG. 12, a floatation attachment device 10 may include a water sensitive material 48 that covers or retains expansion material 22 in a compressed state and be configured to breakdown upon sufficient water contact. Additionally or alternatively, a water selective membrane 56 may cover and/or retain expansion material 22 and be configured to allow water passage at a predetermined pressure, such as that described herein. In a further example, the water selective membrane 48 is configured to breakdown or may include a water sensitive material 48 configured for release upon sufficient water contact to allow expansion of the expansion material 22. In one configuration, the expansion material 22 is contained within an expandable chamber wherein water entry into one or more openings to the chamber are regulated by valves, pores of water selective membranes, or water sensitive materials, as described herein. Additionally or alternatively, gas generating reactants 24, described in more detail below, may also be included such that water exposure generates gas within the expansion material 22 to increase buoyancy.

Notably, while embodiments may include an expansion material, the floatation attachment device 10 need not always correspondingly expand. For example, expansion material 22 may expand within a chamber 46 along with gas generation or gas generation alone to increase buoyancy within a chamber 46 that does not expand.

As introduced above, in some embodiments, expansion material 22 may include gas generating reactants 24. Gas generating reactants 24 may be embedded in, impregnated within, coated on, or positioned within a solid or gel expansion material 22 or non-expansion floatation material 20. Example gases that may be generated include nitrogen, oxygen, carbon dioxide, and hydrogen. Gas generating reactant 24 expansion materials 22 may include an acid reactant such as a suitable organic acid or inorganic acid and a base reactant that rapidly react with water to release carbon dioxide. Acids may include, for example, acidic or tartaric acids or suitable salt thereof, or biphosphates. Bases may include suitable carbonates or hydrogen carbonates such as sodium bicarbonate. In some embodiments, expansion materials 22 that include gas generating reactants 24, whether alone or in combination with water, may include magnesium carbonate and hydrochloric acid, calcium carbonate and hydrochloric acid or suitable salt thereof, potassium monopersulfate with another peroxygen compound and an alkaline agent, sodium dihydrogen phosphate anhydrous (anhydrous sodium acid phosphate) and sodium bicarbonate, sodium bicarbonate and acetic acid or suitable salt thereof, or zinc and dilute sulfuric acid or suitable salt thereof.

In some embodiments, the expansion material 22 includes a gas generating reactants 26 wherein contact with water drives gas evolution through chemical reaction with water, water providing a medium for reaction, or water triggering release of two or more reactants of the gas generating reactants 24 that together react to generate gas.

Figure 13:
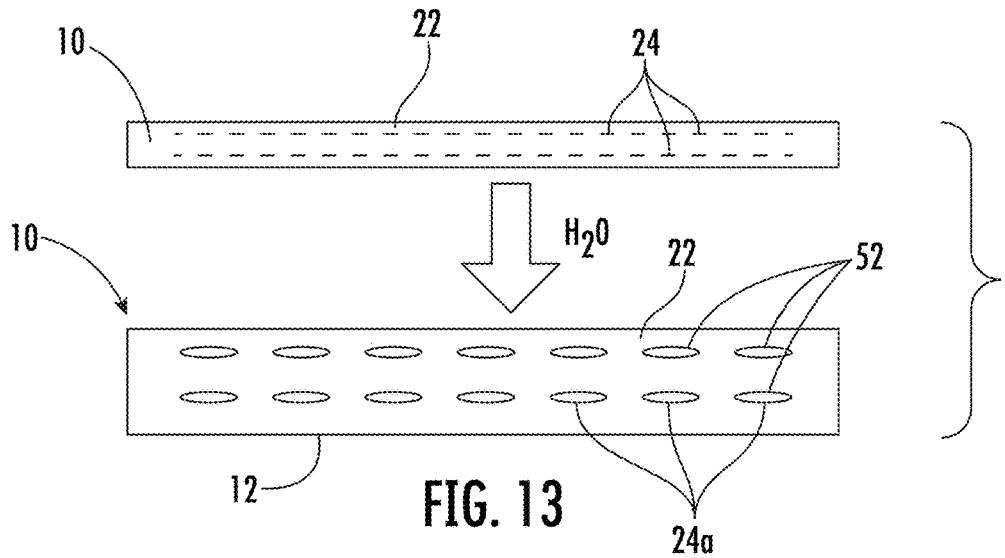
FIG. 13 illustrates cross-section views of an expandable floatation attachment device in a non-expanding state and in an expanded state upon contact with water according to various embodiments described herein.

In one embodiment, gas generating reactants 24 may impregnate or be positioned with an expansion material or matrix thereof. For example, FIG. 13 illustrates a floatation attachment device 10 comprising a compressed expansion material 22 wherein gas generating reactants 24 are positioned within compressed voids of the expansion material 22. Upon introduction of water, the gas generating reactants 24 generate gas 24a to expand void spaces 52.

Figure 14:
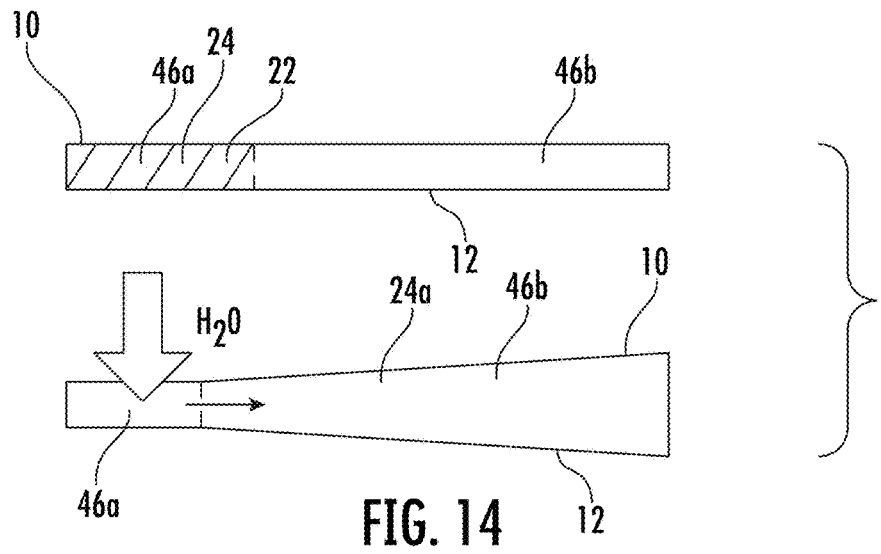
FIG. 14 illustrates cross-section views of an expandable floatation attachment device in a non-expanding state and in an expanded state upon contact with water according to various embodiments described herein.
Figure 15:
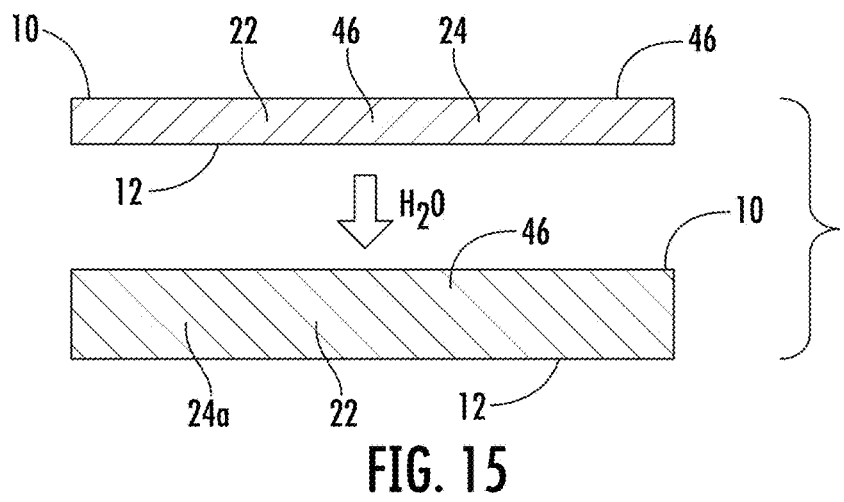
FIG. 15 illustrates cross-section views of an expandable floatation attachment device in a non-expanding state and in an expanded state upon contact with water according to various embodiments described herein.

In one embodiment, the floatation material 20 may consist of gas generating reactants 24 and the gas generated therefrom. For example, FIG. 15 illustrates a floatation attachment device 10 comprising gas generating reactant 24 expansion material 22 contained with a chamber 46. Introduction of water into the chamber 46 drives gas generation and expansion of the chamber that increases buoyancy. In some embodiments, multiple chambers 46 may be used. For example, FIG. 14 illustrates a floatation attachment device 10 comprising gas generating reactant 24 expansion material 22 contained with a first chamber 46a. Introduction of water into the first chamber 46a drives gas generation that results in gas 24a flow into a second chamber 46b that is expandable, thereby increasing buoyancy. In further embodiments of FIG. 14, the second chamber 46b may include a compressed or pre-expanded expansion material 22 that the generated gas 24a expands and/or fills voids therein.

In various embodiments, the floatation attachment device 10 includes one or more openings 42 providing access to floatation material 20 or a chamber 46 housing floatation material 20 from an exterior 40 of the floatation attachment device 10. As introduced above, carious configurations may be equipped with one or more water control devices 44 configured to regulate access of water to the floatation material 20 or a barrier to the release of compression, pressure, division, of floatation material 20, which may include gas generating reactants 24. For example, one or more water control devices 44, such as valves 54, water sensitive materials 48, or pressure-based water selective membranes 56, may be positioned along an exterior 40 of the floatation attachment device 10 to control entry of exterior water into a chamber 46, or multiple chambers 46 through one or more openings 42. Water control devices 44 may comprise one or more valves 54, a water sensitive material 48 configured to breakdown upon sufficient contact with water, or water selective membrane 56. In one example, a water control device 44 comprises one or more valves 54 positioned between a chamber 46 and an exterior of the floatation attachment device 10 (see, e.g., FIG. 15B). In a further example, valves 54 may comprise a one-way valve, such as a duck bill or pressure valve, configured to allow water from an exterior 40 of the floatation attachment device 10 into a chamber 46 or directly into an expansion material 22. The valve 54 may be set to allow water to enter the chamber 46 or expansion material 22 at a pressure corresponding to pressure at a water depth of about 0.25 inches or greater, about 0.5 inches or greater, about 0.75 inches or greater, about 1.0 inches or greater, or about 1.25 inches or greater. The valve pressure of the valve 54 may be set to allow inflow of water at pressures corresponding to greater or lesser depths. A water selective membrane 56 having pores for allowing water to pass may similarly be configured for passage of water from an exterior 40 of a chamber 46, floatation material 20. or floatation attachment device 10. In one example, the water selective membrane 56 may be configured to allow passage of water at pressures corresponding to those described above with respect to a valve 54. The water selective membrane 56 or valve 54 may be gas impermeable with respect to outflow or may be configured to limit gas outflow. In some embodiments, water control devices 44 may be configured to prevent or retard outflow of gas from a chamber 46 or expansion material 22 corresponding to a predetermined interior pressure build-up due to gas generation that may apply pressure against the membrane 56 or valve 56.

Figure 16A:
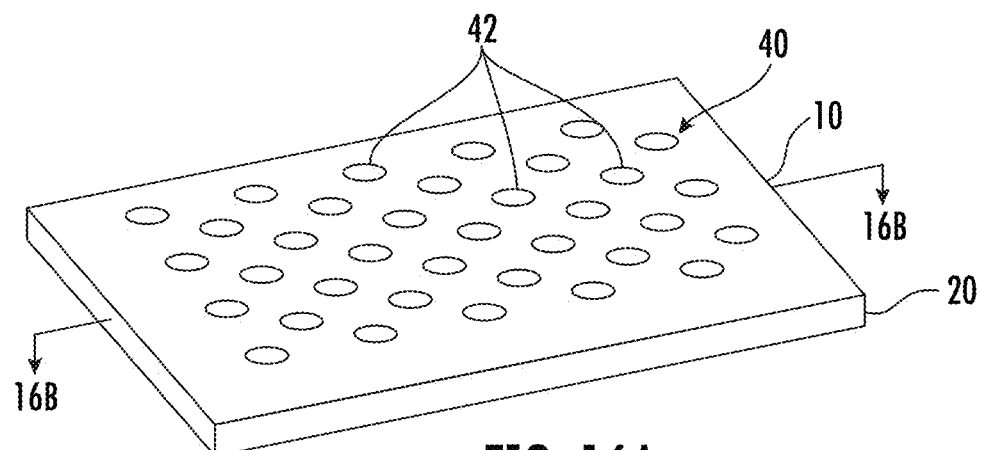
FIG. 16A illustrates openings provided along an exterior of a floatation attachment device and FIG. 16B illustrates a cross-section of the attachment device along line 16B according to various embodiments described herein.
Figure 16B:
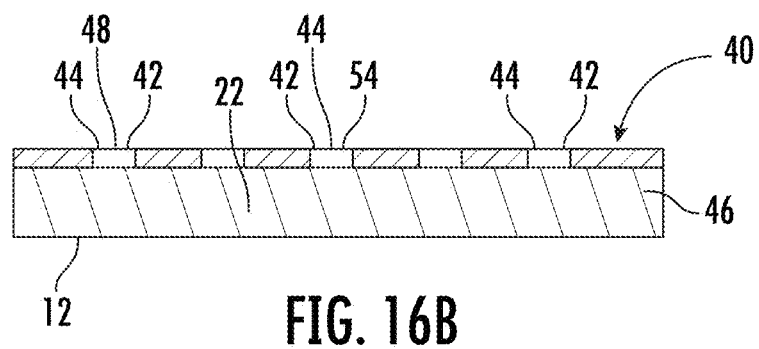

FIGS. 16A & 16B illustrate an example floatation attachment device 10 including a chamber 46 housing expansion material 22. Openings 42 are provided between the chamber 46 and an exterior 40. Water control devices 44 are positioned at the openings 42 to regulate water inflow into the chamber 46. The cross-section of FIG. 16B illustrates example water control devices comprising an opening 42 covered with water sensitive material 48, a valve 54 positioned in an opening 42, and a water selective membrane 56 positioned within an opening 42. Floatation attachment devices 10 may be provided with a suitable number and sized openings 42.

Figure 17:
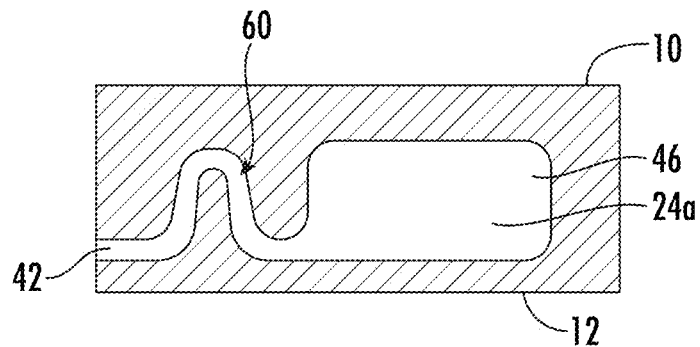
FIG. 17 illustrates a cross-section view of an floatation attachment device according to various embodiments described herein.

As introduced above, in various embodiments, gas generating reactants 24 may be contained within a chamber 46 of the floatation attachment device 10. With particular reference to FIG. 17, in some embodiments, the chamber 46 or opening 42 thereto may include a tortuous fluid path 60 and/or may branch out to multiple chamber arms. The fluid path 60 and/or arms thereof may be positioned at varied angles to aid in retention of gas 24a within the chamber 46 if the angle of the floatation attachment device 10 relative to gravity changes. In one embodiment of the floatation attachment device 10 of FIG. 17, the chamber 46 is an expandable chamber 46 that is compressed in a compressed or non-expanded state prior to water contact with gas generating reactants 24. For example, gas generating reactants 24 may be positioned within the opening 42, which may include lining or coating the opening 42, fluid path 60, or chamber 46. Contact with water drives gas generation that flows into the chamber 46 to expand the same. Water control devices 44 as described herein may similarly be used to regulate water inflow or both water inflow and gas outflow.

Figure 18:
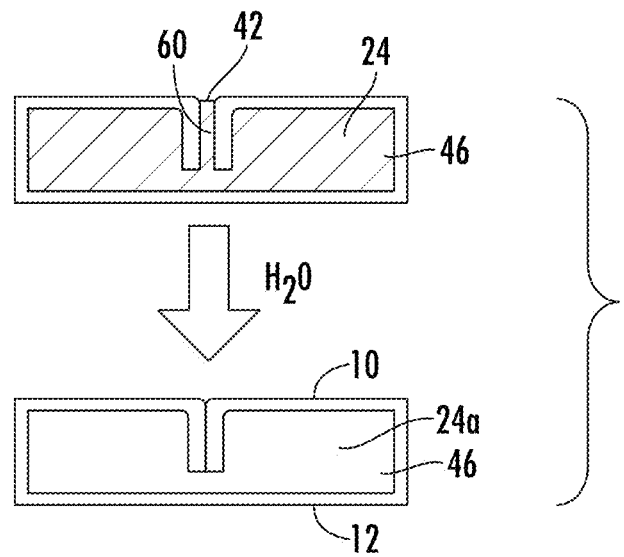
FIG. 18 illustrates cross-section views of a floatation attachment device before water contact with expansion material and following contact with water according to various embodiments described herein.
Figure 19:
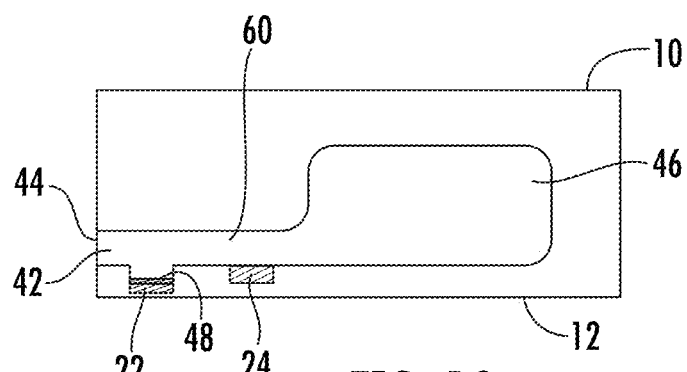
FIG. 19 illustrates a cross-section view of a floatation attachment device according to various embodiments described herein.
Figure 20:
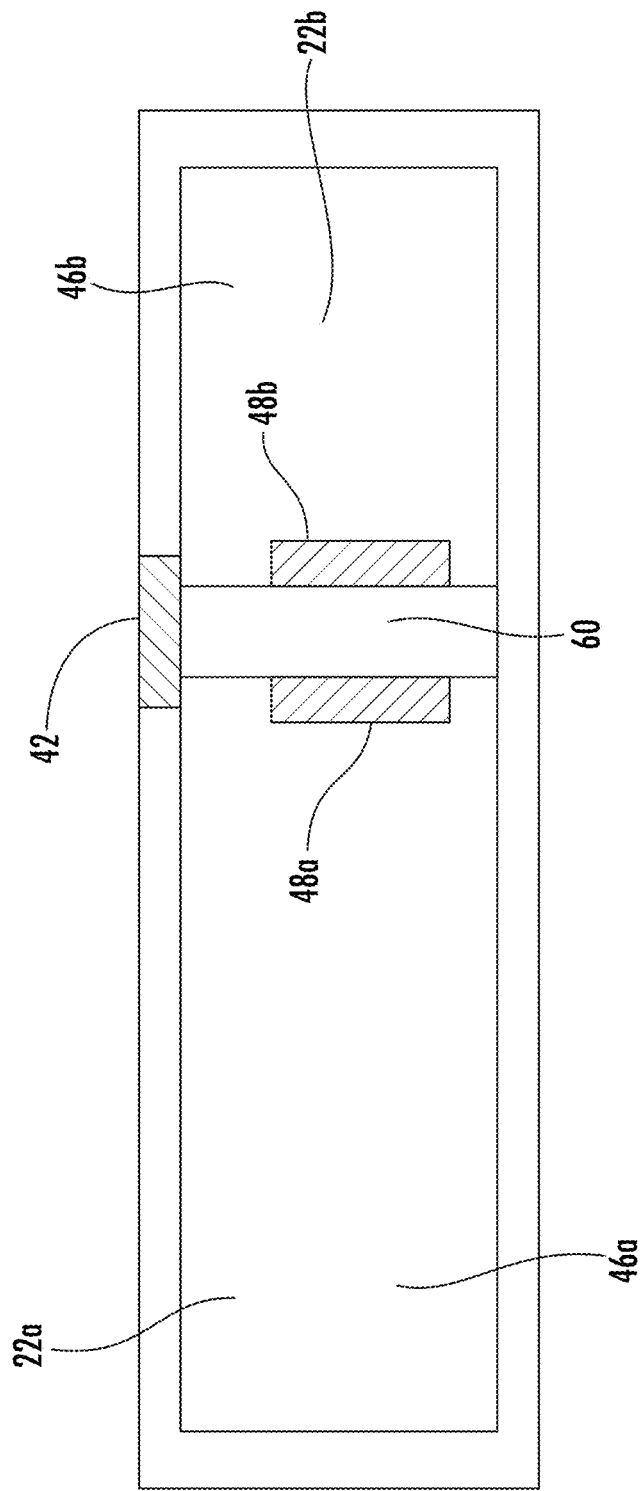
FIG. 20 illustrates a cross-section view of a floatation attachment device according to various embodiments described herein.

As introduced above, In various embodiments, a chamber 46 or portion thereof is configured to expand, deform, or reconfigure in response to the gas generation or expansion of an expansion material 22. In one example, expansion may result in restriction of an opening 42 or fluid path 60 thereof to the chamber 46. For example, expansion may stretch or pinch off openings 42 to block or restrict fluid paths 60. For example, the chamber 46 may include one or more openings 42 including a fluid path 60 that leads to a chamber 46. Expansion of the chamber 46 may be configured to collapse or restrict the fluid path 60. FIG. 18 illustrates an example, wherein introduction of water through an opening 42 into a chamber 46 housing gas generating reactants 24 causes gas generation within the chamber 46 wherein the pressure from the gas 24a restricts a fluid path 60 into the chamber to block further inflow of water through the opening 42. In some embodiments, a pressure relief valve (not shown) may also be included to release significant air pressure if present. In another embodiment, with particular reference to FIG. 19, water may enter the chamber 46 or a receiving area along a fluid path 60 wherein a water level or residence time of water exposure may result in blocking openings 42 to the chamber, e.g., by activation of a foam expansion material. In the illustrated embodiment, gas generating agent 24 is positioned along a fluid path 60 between an opening 42 and a chamber 46. An expansion material 22 comprising a compressed foam or foam material configured to expand upon contact with water is positioned adjacent to an opening 42, also along the fluid path 60 to the chamber 46. The expansion material 22 is covered with a water sensitive material 48. Water inflow initially contacts the water sensitive material 48 and the gas generating reactants causing gas generation to flow into the chamber. After a sufficient reaction time to fill the chamber with gas, the water sensitive material 48 is configured to breakdown to allow water to contact the expansion material to block the opening 42. Water sensitive materials may include those known in the art, such as cellulose, sugars, starches, salts, or water soluble materials.

While various amounts and gas generation periods may be used, in one example, the amount and/or arrangement of gas generating reactant 24 may be configured to provide rapid initial gas generation followed by reduced gas generation for an extended period of time. In some embodiments, the gas generating reactants 24 may coat chamber walls, which may include along walls of an opening 42 or fluid path 60 thereof.

As introduced above, the floatation attachment device 10 may be expandable upon contact with water. For example, the floatation attachment device 10 may include expansion material 22 that expands upon contact with water to expand to an expanded state. Additionally or alternatively, one or more chambers 46 may be defined by expandable walls. Expandable walls may include walls configured to stretch, unfold, or otherwise expand such that the volume of the floatation attachment device 10 increases when transitioning to the expanded state. Expansion may be driven by gas generation, e.g., chemically or liquid to gas transition due to release of pressure. In some embodiments, water sensitive materials 48 may be positioned to at least partly retain the floatation attachment device 10 in an unexpanded state.

In another example, contact with water may release a supply of water within the floatation attachment device 10 into contact with gas generation reactants 24 to generate gas 24a. In some embodiments, contact with water may drive combining of separated expansion materials 22, which may include gas generation reactants 24, that when combined expand and/or generate gas to transition the floatation attachment device 10 to an expanded state. For example, with reference to FIG. 20, a floatation attachment device 10 may include first and second chambers 46a, 46b, each holding a corresponding first or second expansion material 22a, 22b, at least one of the expansion materials 22a, 22b comprising a liquid. The expansion materials 22a, 22b may include zinc and dilute sulfuric acid, respectively, wherein water releases a supply of the dilute sulfuric acid into contact with the zinc. The water may be introduced through an opening 42, which may be regulated by a water control device 44 as described herein, such as a water selective membrane 56, valve 54, or water sensitive material 48. The water may breakdown a water sensitive material 48 between separating the zinc and dilute sulfuric acid supply to allow the two to mix to drive generation of hydrogen gas to drive expansion. In the illustrated configuration, a water receiving fluid path 60 is positioned adjacent to the opening 42 and is separated from the first chamber 26a housing the zinc by a first water sensitive material and from the second chamber 26b housing the sulfuric acid by a second water sensitive material 48b. In one example, the first water sensitive material 48a may be less sensitive to water or may be thicker/denser than the second water sensitive material 48b to allow the sulfuric acid to be released into the fluid passage before the first water sensitive material 48 breaks down. The first water sensitive material 48a may also be sensitive to acid to rapidly break down upon contact. In another configuration, the water sensitive materials 48a, 48b are equally sensitive to water to break down at similar times. Additionally or alternatively, sulfuric acid salts may be used wherein contact with water solubilizes the salt into solution for reaction with the zinc.

In some embodiments, the floatation attachment device 10 including the expansion material may lack sufficient buoyancy to float itself or support floatation of an equal volume sphere, prior to expansion, double its mass. However, in other embodiments, the floatation attachment device 10 including the expansion material 22 may provide sufficient buoyancy to float itself and support floatation of an equal volume sphere, prior to expansion, double or triple its mass.

This disclosure describes various elements, features, aspects, and advantages of various embodiments of the floatation attachment device 10 and methods thereof. It is to be understood that certain descriptions of the various embodiments have been simplified to illustrate only those elements, features and aspects that are relevant to a more clear understanding of the disclosed embodiments, while eliminating, for purposes of brevity or clarity, other elements, features and aspects.

Any references to "various embodiments," "certain embodiments," "some embodiments," "one embodiment," or "an embodiment" generally means that a particular element, feature and/or aspect described in the embodiment is included in at least one embodiment. The phrases "in various embodiments," "in certain embodiments," "in some embodiments," "in one embodiment," or "in an embodiment" may not refer to the same embodiment. Furthermore, the phrases "in one such embodiment" or "in certain such embodiments," while generally referring to and elaborating upon a preceding embodiment, is not intended to suggest that the elements, features, and aspects of the embodiment introduced by the phrase are limited to the preceding embodiment; rather, the phrase is provided to assist the reader in understanding the various elements, features, and aspects disclosed herein and it is to be understood that those having ordinary skill in the art will recognize that such elements, features, and aspects presented in the introduced embodiment may be applied in combination with other various combinations and sub-combinations of the elements, features, and aspects presented in the disclosed embodiments. The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

What is claimed is:

1. A floatation attachment system comprising:
   a floatation attachment device configured to be attached to an object comprising:
      a floatation material configured to provide buoyancy; and
      an attachment surface configured to directly attach the object; and
   a dispenser configured to dispense a plurality of floatation attachment devices,
      wherein the dispenser comprises a tape roll including a backing layer positioned along the attachment surface that is removable to expose the attachment surface for attachment to the object.

2. The floatation attachment system of claim 1, wherein the floatation material comprises a gel or foam.

3. The floatation attachment system of claim 2, wherein the floatation device comprises an aerogel.

4. The floatation attachment system of claim 2, wherein the expansion material comprises neoprene.

5. The floatation attachment system of claim 1, wherein the floatation attachment device is between 0.1 and 3 cm thick and between 0.5 and 4 inches in width and length.

6. A floatation attachment system comprising:
a floatation attachment device configured to be attached to an object comprising:
a floatation material configured to provide buoyancy; and
an attachment surface configured to directly attach the object,
wherein the floatation material comprises an expansion material,
wherein the expansion material comprises one or more gas generating reactants that generate gas upon contact with water or upon being mixed together.

7. The floatation attachment system of claim 6, wherein the expansion material further comprises a compressed material impregnated with the one or more gas generating reactants.

8. The floatation attachment system of claim 6, wherein the attachment surface includes an adhesive for directly attaching the attachment surface to the object.

9. The floatation attachment system of claim 6, wherein the floatation attachment device is provided on a sheet, wherein the sheet includes a backing layer upon which the attachment surface is positioned, and wherein the floatation attachment device is configured to be removed from the backing layer to expose the attachment surface for attachment to the object.

10. The floatation attachment system of claim 6, wherein the floatation attachment device is provided on a sheet that includes a plurality of floatation attachment devices that have multiple pre-cut shapes and dimensions, wherein the sheet includes a backing layer upon which the attachment surface is positioned, and wherein the floatation attachment device is configured to be removed from the backing layer to expose the attachment surface for attachment to the object.

11. A floatation attachment system comprising:
a floatation attachment device configured to be attached to an object comprising:
a floatation material configured to provide buoyancy;
an attachment surface configured to directly attach the object, wherein the floatation material comprises an expansion material; and
a chamber housing the one or more gas generating reactants and an opening between the chamber and an exterior of the floatation attachment device.

12. The floatation attachment system of claim 11, further comprising a water control device comprising a valve, water selective membrane, or water sensitive material positions to regulate water inflow to the chamber.

13. The floatation attachment system of claim 12, wherein the water control device comprises a pressure activated one-way valve that allows water inflow upon exposure to a predetermined pressure.

14. The floatation attachment system of claim 11, wherein the attachment surface includes an adhesive for directly attaching the attachment surface to the object.

15. The floatation attachment system of claim 11, wherein the floatation attachment device is provided on a sheet, wherein the sheet includes a backing layer upon which the attachment surface is positioned, and wherein the floatation attachment device is configured to be removed from the backing layer to expose the attachment surface for attachment to the object.

16. The floatation attachment system of claim 11, wherein the floatation attachment device is provided on a sheet that includes a plurality of floatation attachment devices that have multiple pre-cut shapes and dimensions, wherein the sheet includes a backing layer upon which the attachment surface is positioned, and wherein the floatation attachment device is configured to be removed from the backing layer to expose the attachment surface for attachment to the object.

17. A floatation attachment system comprising:
a floatation attachment device configured to be attached to an object comprising:
a floatation material configured to provide buoyancy;
an attachment surface configured to directly attach the object, wherein the floatation material comprises an expansion material;
at a least first chamber housing a first material and a second chamber housing a second material;
a water sensitive material separating the first and second chambers;
an opening to an exterior of the floatation attachment device; and
a passage between the opening and the water sensitive material, wherein the expansion material comprises the first material and the second material and the first material and second materials are configured to react when contacted to generate a gas.

18. The floatation attachment system of claim 17, wherein at least one of the first chamber or the second chamber is configured to expand when the first and second materials react to generate the gas.

19. A floatation attachment system comprising:
a floatation attachment device configured to be attached to an object comprising:
a floatation material configured to provide buoyancy;
an attachment surface configured to directly attach the object, wherein the floatation material comprises an expansion material;
at least a first chamber housing a first material and a second chamber housing a second material, a water sensitive material separating the first and second chambers;
an opening to an exterior of the floatation attachment device; and
a passage between the opening and the water sensitive material, wherein the expansion material comprises the first material and the second material and wherein the first material is configured to expand when contacted with the second material.

20. The floatation attachment system of claim 19, wherein at least one of the first chamber or the second chamber is configured to expand when the first material expands.

* * * * *